(No Model.)
G. R. WILLIAMS.
VEHICLE WHEEL.
No. 498,373. Patented May 30, 1893.
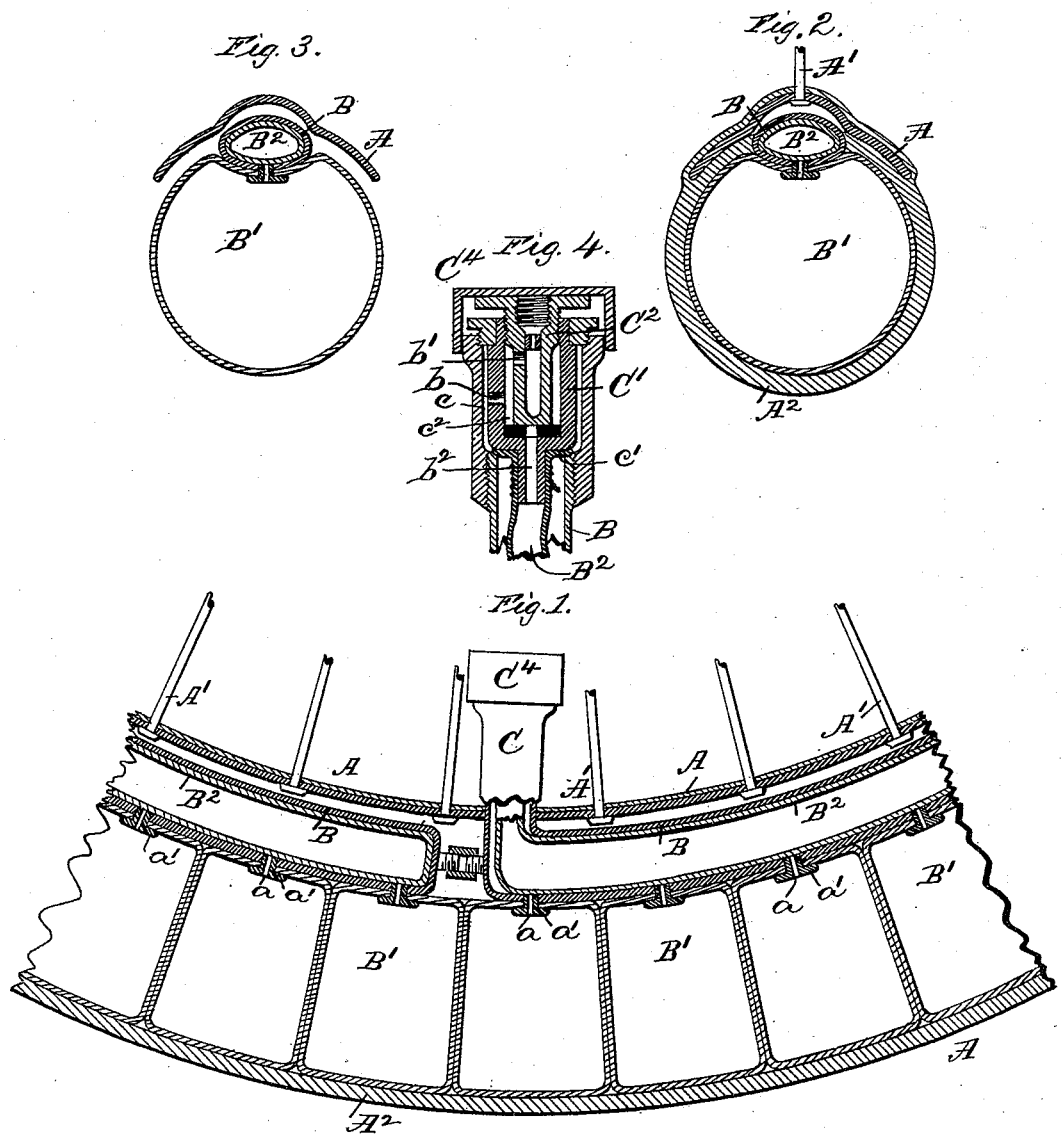
Witnesses
Victor P. Wilson
Louis Dubois
Inventor
George R. Williams
By his Attorney
W. L. Bennem

UNITED STATES PATENT OFFICE.

GEORGE R. WILLIAMS, OF BROOKLYN, NEW YORK.

VEHICLE-WHEEL.

SPECIFICATION forming part of Letters Patent No. 498,373, dated May 30, 1893.

Application filed July 16, 1892. Serial No. 440,238. (No model.)

*To all whom it may concern:*

Be it known that I, GEORGE R. WILLIAMS, of Brooklyn, county of Kings, and State of New York, have invented certain new and useful Improvements in Vehicle-Wheels, of which the following is a specification.

This invention relates more particularly to bicycle wheels, and it consists in the construction and novel arrangement of a pneumatic tire therefor, as will hereinafter appear.

In the accompanying drawings, Figure 1, is a vertical section of a portion of a wheel embodying the improvement. Fig. 2, is a transverse section thereof. Fig. 3, is a transverse section with a certain part removed. Fig. 4, is a section, on an enlarged scale, of a valve employed.

Referring by letter to the drawings, A, designates the metal rim of a wheel, to which the ends of the wire spokes A' are attached. The rim A, has a tubular rubber tire $A^2$ secured to it in the usual manner; and it also has on its periphery a metal tube B, which encircles the rim and has one end tightly closed and the other end provided with a valve which will be hereinafter described. The ends of the metal tube B are provided with bolts and nut, for the purpose of securing them together, as shown in Fig. 1, of the drawings.

B' designates a series of air cells arranged closely together within the tire $A^2$. These cells consist of thin flexible material, such as rubber and are rigidly attached at one side to the metal tube B, by means of a suitable cement. Each cell B', communicates with the interior of the tube B, through a perforation $a$, here shown as formed in a nipple $a'$ secured in a perforation in the tube.

$B^2$ is a valve for closing all the perforations $a$, simultaneously and prevents escape of air from either of the cells, through the perforation. This valve $B^2$ consists of a flexible rubber tube arranged within the metal tube B, as shown. It is of sufficient size when distended by air forced into it, to fill the tube B, and close the perforations.

By the construction so far described it is obvious that the several cells B', may be distended with air to any desired degree to form a "cushion" for the tire $A^2$, and that, should one or more of the cells be broken by a puncture from the outer side, the air will still be retained in the unbroken cells.

I will now describe my double acting valve through which air is forced to fill the cells B', and to distend the valve tube $B^2$.

C, designates the valve casing extended through the rim A, and attached, by means of a screw-thread, or otherwise, to the outwardly turned end of the tube B.

C' is a longitudinally perforated valve sleeve, vertically movable within the casing C. It is shown as having a screw-thread on its outer side, near its top, to engage an interior thread in the casing. There is an annular air space $c$ between the outer side of the valve sleeve C', and the interior of the casing, and the sleeve is reduced in diameter at its lower end, and to this reduced portion the end of the valve tube $B^2$ is secured. The end of the tube $B^2$ is turned outward as at $c'$, and projects over a shoulder formed by the end of the tube B, so that when the sleeve C' is turned downward it will force the rubber on the shoulder and prevent the escape of air, before the nipples of the several cells shall have been closed. $C^2$, shows a valve plug within the valve sleeve C'. At its upper exterior portion the plug $C^2$ is threaded to engage an interior thread of the sleeve. There is an annular air space $c^2$ between the plug $C^2$ and the interior of the sleeve C'.

The sleeve C' has a duct $b$ through its wall, which provides communication between the spaces $c$, $c^2$, and the plug has a duct $b'$, providing a communication between the space $c^2$, and the hollow interior of the plug. The upper end of the plug $C^2$, has an interior screw-thread portion to which a tube leading from an air pump may be attached, when desired.

The plug $C^2$ is sufficiently long, so that when forced down, it may effectually close the inlet $b^2$ leading into the tube $B^2$, and prevent the escape of air.

A dust cap $C^4$, may be provided for the valve.

In filling the cells B' with air, a force pump is attached to the valve and the plug $C^2$ is forced down to close the duct $b^2$, while the sleeve C', is in its upward position to release the end of the tube $B^2$. Air will be forced through the duct $b'$, the space $c^2$, the duct $b$, and the space $c$ into the metal pipe B, and thence through the several perforations $a$, to fill the cells. After a sufficient quantity of air shall have been forced in the sleeve $C'$ is forced down and the plug $C^2$ raised. Then by further pumping of air the tube $B^2$ will be distended to close all the perforations $a$. The plug $C^2$ is forced down to close the duct $b^2$, and the pump removed.

Having described my invention, what I claim is—

1. The combination with the flexible tubular tire, of the independent cells of flexible material therein, an annular metal tube having communications with each of said cells, a valve through which air may be supplied to the cells, and the flexible tube for simultaneously closing the communication between the metal tube and all of the cells, substantially as specified.

2. The combination with the metal rim and the flexible tire secured thereto, of the metal tube secured to the rim, the cells secured to the tube, and having communication therewith, a flexible valve tube within the metal tube for closing said communications, and a valve adjustable to admit air alternately to the cells and flexible valve tube, substantially as specified.

3. The combination with the air cells, the metal tube and the flexible tubular valve, of the valve communicating with said metal tube and flexible tubular valve, consisting of the casing, the valve sleeve movable thereon, and having an air duct, and the valve plug movable in the sleeve and having the air duct, substantially as specified.

GEORGE R. WILLIAMS.

Witnesses:
NATHANIEL BARR,
LOUIS DUBOIS.